US012659662B2

(12) United States Patent
Henderson et al.

(10) Patent No.: US 12,659,662 B2
(45) Date of Patent: Jun. 16, 2026

(54) NETWORK CAPABLE PARAMETRIC SPEAKER ARRAY WITH INTERFEROMETER AND DISTRIBUTED COHERENCE SYSTEM

(71) Applicant: The United States of America, as represented by the Secretary of the Navy, Crane, IN (US)

(72) Inventors: Scott J. Henderson, Bloomington, IN (US); Ryan J. Dowd, Bloomington, IN (US); Corey A. M Bergsrud, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 126 days.

(21) Appl. No.: 18/137,834

(22) Filed: Apr. 21, 2023

(65) Prior Publication Data

US 2023/0388707 A1 Nov. 30, 2023

Related U.S. Application Data

(60) Provisional application No. 63/333,204, filed on Apr. 21, 2022.

(51) Int. Cl.
| | |
|---|---|
| *H04R 29/00* | (2006.01) |
| *G01H 9/00* | (2006.01) |
| *H04R 1/40* | (2006.01) |
| *H04R 3/12* | (2006.01) |

(52) U.S. Cl.
CPC ................. *H04R 3/12* (2013.01); *G01H 9/00* (2013.01); *H04R 1/403* (2013.01); *H04R 29/002* (2013.01)

(58) Field of Classification Search
CPC ......... H04R 29/00; H04R 29/001; H04S 7/30; H04S 7/301
USPC ...................................................... 381/58–59
See application file for complete search history.

(56) References Cited

U.S. PATENT DOCUMENTS

| | | | | |
|---|---|---|---|---|
| 6,690,802 | B2 * | 2/2004 | Stickles ................. | H04R 27/00 381/387 |
| 7,424,118 | B2 * | 9/2008 | Mori ......................... | H04R 3/12 381/104 |
| 8,594,350 | B2 * | 11/2013 | Hooley .................... | H04S 7/301 381/59 |
| 10,362,409 | B1 * | 7/2019 | Dewasurendra ...... | G01S 7/4808 |
| 11,005,440 | B2 * | 5/2021 | Shaya ................... | H04R 29/001 |
| 11,573,761 | B2 * | 2/2023 | Bonde ................... | H04W 12/50 |
| 11,592,328 | B2 * | 2/2023 | Rengan ................. | H04R 17/00 |
| 11,805,359 | B2 * | 10/2023 | Pompei ................. | H04R 1/406 |
| 2009/0116660 | A1 * | 5/2009 | Croft, III .............. | H04R 27/00 340/384.1 |
| 2019/0297416 | A1 * | 9/2019 | Deng ...................... | H04S 7/303 |

* cited by examiner

*Primary Examiner* — Disler Paul

(74) *Attorney, Agent, or Firm* — Naval Surface Warfare Center, Crane Division; Patrick B. Law

(57) ABSTRACT

Disclosed are systems and methods utilize networked speaker arrays and audio waveform shaping using interferometric feedback of sound transmitted by the speaker arrays. In further aspects, the systems and method employ an intelligently controlled acoustic device that can focus sound at specific locations and record the acoustic environment/ reflected sound to self-calibrate for improved performance. Moreover, the device is modular and scalable with the ability to network distributed speakers to enhance the audio performance.

18 Claims, 3 Drawing Sheets

300

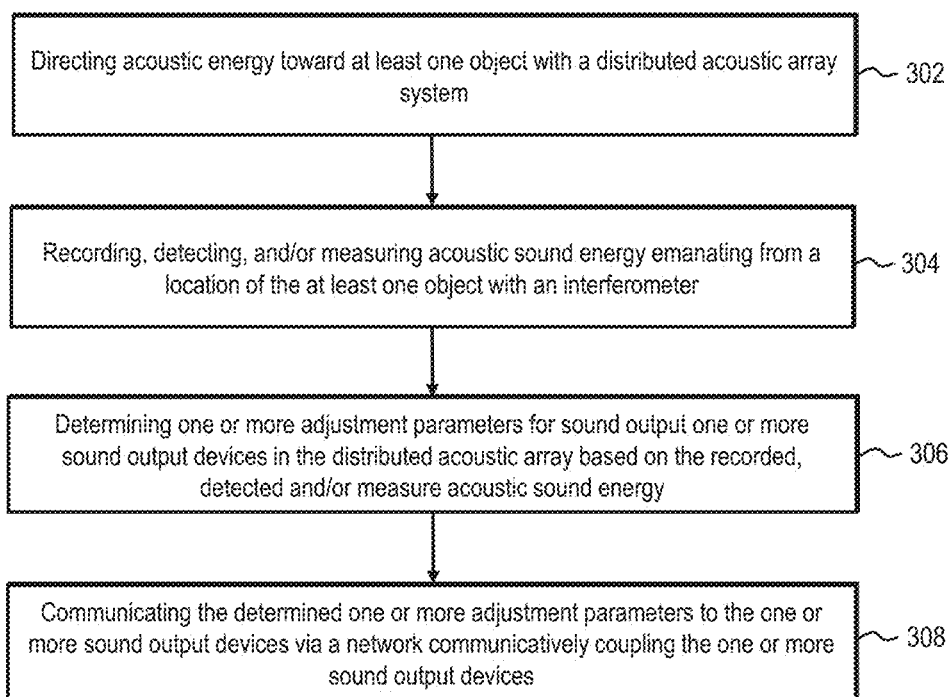

Directing acoustic energy toward at least one object with a distributed acoustic array system ⟿ 302

Recording, detecting, and/or measuring acoustic sound energy emanating from a location of the at least one object with an interferometer ⟿ 304

Determining one or more adjustment parameters for sound output one or more sound output devices in the distributed acoustic array based on the recorded, detected and/or measure acoustic sound energy ⟿ 306

Communicating the determined one or more adjustment parameters to the one or more sound output devices via a network communicatively coupling the one or more sound output devices ⟿ 308

*FIG. 3*

NETWORK CAPABLE PARAMETRIC SPEAKER ARRAY WITH INTERFEROMETER AND DISTRIBUTED COHERENCE SYSTEM

CROSS-REFERENCE TO RELATED APPLICATIONS

The present application claims priority to U.S. Provisional Patent Application Ser. No. 63/333,204 filed Apr. 21, 2022, and entitled "NETWORK CAPABLE PARAMETRIC SPEAKER ARRAY WITH INTERFEROMETER AND DISTRIBUTED COHERENCE SYSTEM," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 2110431.7502) is assigned to the United States Government and is available for licensing for commercial purposes. Licensing and technical inquiries may be directed to the Technology Transfer Office, Naval Surface Warfare Center Crane, email: Cran_T2@navy.mil.

FIELD

The present disclosure relates generally to acoustic systems. More particularly, the disclosure relates to modular and scalable ultrasonic speaker arrays and audio waveform shaping devices that have the ability to network distributed speakers to enhance the audio performance.

BACKGROUND

Long-range acoustic devices (LRADs) are high-powered acoustic hailing devices that may achieve long ranges and do not feature automatic calibration or distributed coherence. Fundamentally, an LRAD uses a large parametric speaker array to perform its function. Disadvantages of LRAD systems, however, include the inability to mitigate environmental noise, applications of such systems are limited to hailing, the systems are not network capable, and further such systems do not typically record audio (i.e., they consist only of an emitter). Furthermore, because LRAD systems typically have a large size and high power requirements, they need to be in a fixed location, which limits portability and ease of maintenance.

Accordingly, there is a need for more flexible and configurable acoustic devices that include autonomous system calibration and autonomous network coherence.

SUMMARY

Disclosed is a network capable parametric speaker array using feedback and calibration, such as with an interferometer, and providing a distributed coherence system (e.g., a system that provides phase matching or other waveform shaping to achieve superposition and/or additive effects of the sound waves to achieve increased sound levels). In an illustrative embodiment, the present disclosed systems and methods provide an intelligently controlled acoustic device that can focus sound at specific locations and record the acoustic environment to self-calibrate via feedback and machine learning for improved performance. Moreover, the disclosed systems are modular and scalable with the ability to network distributed speakers to enhance the audio performance.

Additional features and advantages of the presently disclosed systems and method will be apparent to those skilled in the art upon consideration of the following detailed description of the illustrative embodiments.

BRIEF DESCRIPTION OF THE DRAWINGS

The detailed description particularly refers to the accompanying figures in which:

FIG. 3 illustrates a flow diagram of an exemplary method for controlling a scalable ultrasonic speaker array system and performing audio waveform-shaping according to aspects of the disclosure

DETAILED DESCRIPTION

The disclosed examples and embodiments described herein are not intended to be exhaustive or to limit the disclosure to the precise forms disclosed. Rather, the example and embodiments selected for description have been chosen to enable one skilled in the art to practice the presently disclosed invention.

As mentioned before, current acoustic hailing devices, such as LRAD systems, are typically large, high-powered monolithic speaker arrays that lack the ability to calibrate the acoustic system using environmental inputs to adjust the sound waveforms being transmitted. Moreover, current technologies do not offer sound waveform coherence through a networking of distributed assets (e.g., networking of sound emitter systems). Accordingly, the present systems and methods disclosed herein provide a new technical approach to coherent acoustic waveform beamforming (e.g., ultrasonic beamforming), with additional capability for distribution (i.e., distribution of the sound signal) across many emitter systems. Distributed, small, low-power systems utilizing waveform coherence therefore replace large acoustic hailing devices and provide additional functionalities that have applicability to numerous scenarios and fields.

In some aspects, the present disclosure focuses on networked ultrasonic speaker arrays and audio waveform shaping. Further, the disclosed systems provide intelligently controlled acoustic devices that can focus sound at specific locations, as well as record the acoustic environment (e.g., obtain environment and/or sound feedback) to self-calibrate for improved performance. Moreover, the present system may be configured to be modular and scalable with the ability to network distributed speakers to enhance the audio performance. The presently disclosed systems and methods uniquely combine laser interferometry to measure acoustic energy for feedback and parametric speaker array technologies, along with a distributed coherent beamforming technique through a network control system that uses algorithms and/or machine learning (ML) to rapidly tune the audio effects based, at least in part on the laser interferometry to mitigate destructive environmental noise and to enable effective beam coherence of the sound transmitted from the speaker array(s).

Figure 1:
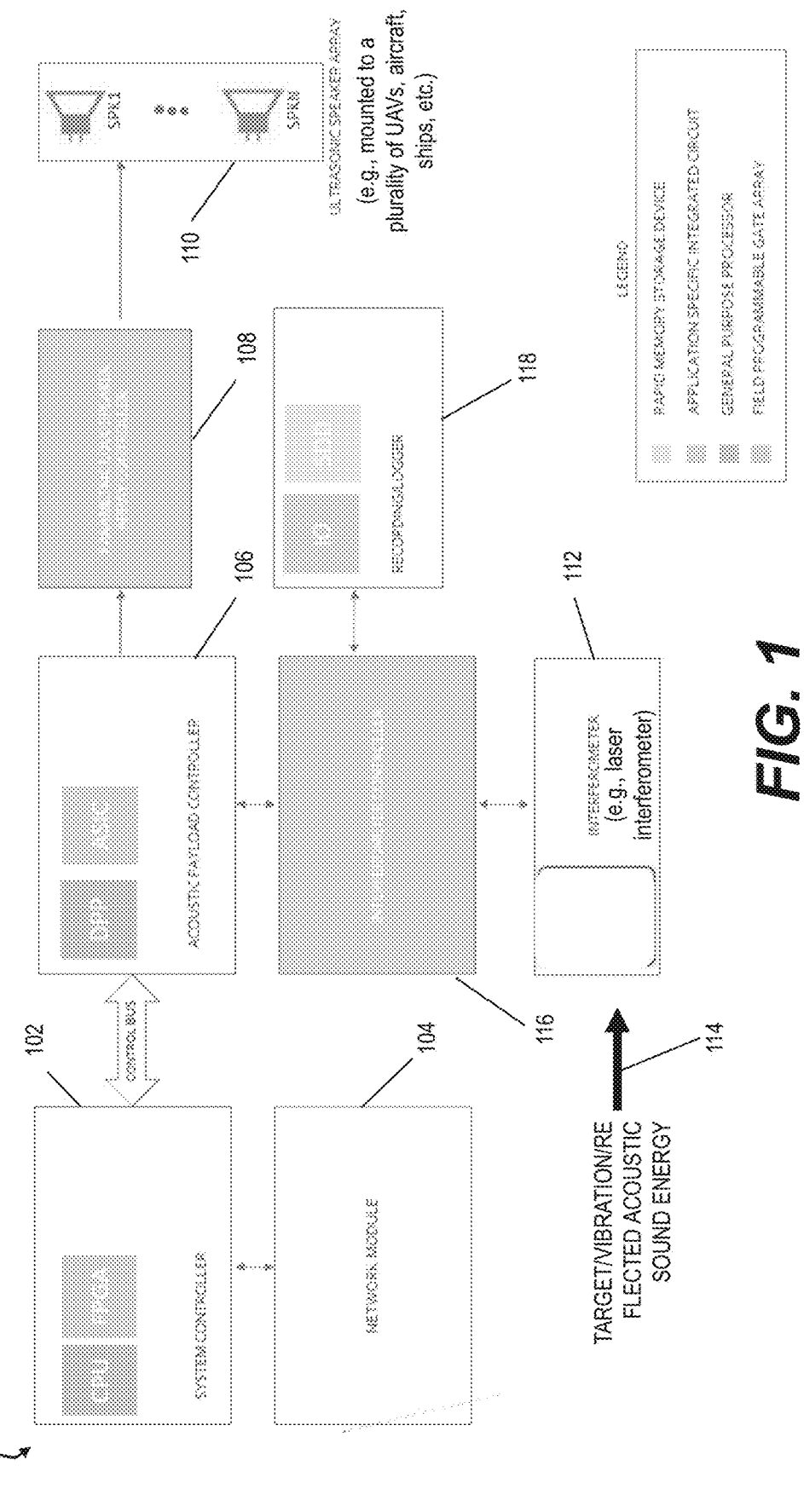
FIG. 1 illustrates a block diagram of one example of various components of a modular and scalable ultrasonic speaker array system and audio waveform-shaping device according to aspects of the disclosure.

FIG. 1 illustrates a block diagram of one example of various components of a modular and scalable ultrasonic speaker array system and audio waveform-shaping device with acoustic feedback (e.g., interferometry feedback) to generate coherent sound waveforms according to aspects of the disclosure. In further aspects, the coherent sound waveforms consist of ultrasonic sound wave coherence in air (e.g., from multiple sound sources that are distributed and separate from each other by some distance). This results in an increase in the sound amplitude/power/pressure without the need for increasing the size of the speaker(s) or speaker power output as in conventional systems, but instead affords the use of a smaller number of emitters that, when combined collaboratively, produce a constructive waveform that performs equal to or better than previous approaches.

As shown in FIG. 1, the system 100 includes a system controller or processor 102 that coordinates both network data from a network module 104, and an acoustic payload controller 106 (termed such as this controller 106 is used, in some aspects, to control speakers on unmanned aerial vehicles (UAVs) that carry a speaker array payload). In aspects, the network module 104 is used to send and/or receive information to or from devices containing speakers as part of a distributed speaker array (e.g., 110 to be discussed below). The network module 104 may communicate, at least in part, through wireless networks (e.g., cellular, wireless local area networks (WLANs), WiFi (IEEE 802.11x) and mesh networks, sidebar communications, etc. along with various encryption and authentication schemes) or electro-optical networks. The controller 102 may be implemented with a general purpose processor (e.g., central processing unit (CPU)) and/or field programmable gate arrays (FPGAs), but is not limited to such and may also be implemented with a specialized processor configured for the specific functionalities described herein.

Additionally, the acoustic payload controller 106 is communicatively coupled with a parametric loudspeaker array controller 108, which also could be implemented within the controller 106 rather than separately as illustrated. The controller 106 is configured to further receive data from an interferometer 112 via an interferometer controller 116 (which could, alternatively be incorporated within the interferometer 112). Further, the interferometer system comprised of the interferometer 112 and the interferometer controller 116 may include a recording or logging device or database 118, for storing data obtained through the interferometer 112 and controller 116. The interferometer system (i.e., interferometer 112, interferometer controller 116, and recording or logging device or database 118) then communicates the interferometer feedback data to the acoustic payload controller 106 (and/or system controller 102), which then perform ML algorithms (as one example) on the data to appropriately tune or adjust the controller 108 and array 110 via network module (104) or other networking to better direct cohered sound waves toward a target, for example.

In further aspects, the interferometer 112 is implemented with a laser interferometer, although other types of interferometry or, generally, targeted sound or acoustic pressure measurement in a desired space/volume, may be contemplated. According to further aspects, the laser interferometer 112 sends out a two-beam laser to measure vibration (e.g., sound or acoustic energy 114 as shown in FIG. 1) of a particular surface (e.g., windows, walls, floors, etc.) or space. Contemplated usage of laser interferometer technology in the present system 100 is to use the return vibration signals or pressures to calibrate the output of the speaker system 110 to effectively beamform the audio waves toward a targeted area or space.

Of further note, in aspects a parametric speaker array may be used for array 110, and provide a highly directive loudspeaker that consists of an array of ultrasonic transducers that exploit the nonlinear properties of air to self-demodulate modulated ultrasonic signals with the aim of creating narrow, focused sound waves (which may be audible and/or inaudible). Furthermore, it is noted that term "parametric" here is derived from and connotes the non-linearity of the frequency response produced by multiple ultrasonic frequencies in air and, as a result, the coherence effect is best modeled with parametric equations. In further aspects, the ultrasonic transducers used in each speaker system may be piezoelectrically driven, but are not necessarily limited to such and may also include one or more conventional speakers, alternative transduction/transducer materials such as ceramics, or LRAD speakers in other aspects. The array 110 constitutes a plurality of speakers that may further be mounted to mobile devices such as UAVs, conventional aircraft, ships, or land vehicles. Furthermore, each of individual speaker systems (e.g., SPK1 . . . SPKN in the array 100) may constitute multiple speakers that are tied together. The use of parametric speaker arrays advance the traditional use of broadcasting audio through distributed and coherent beamforming functionality. This approach provides the capability of numerous smaller devices being able to output the same or greater audio volume as a single large device.

Figure 2:
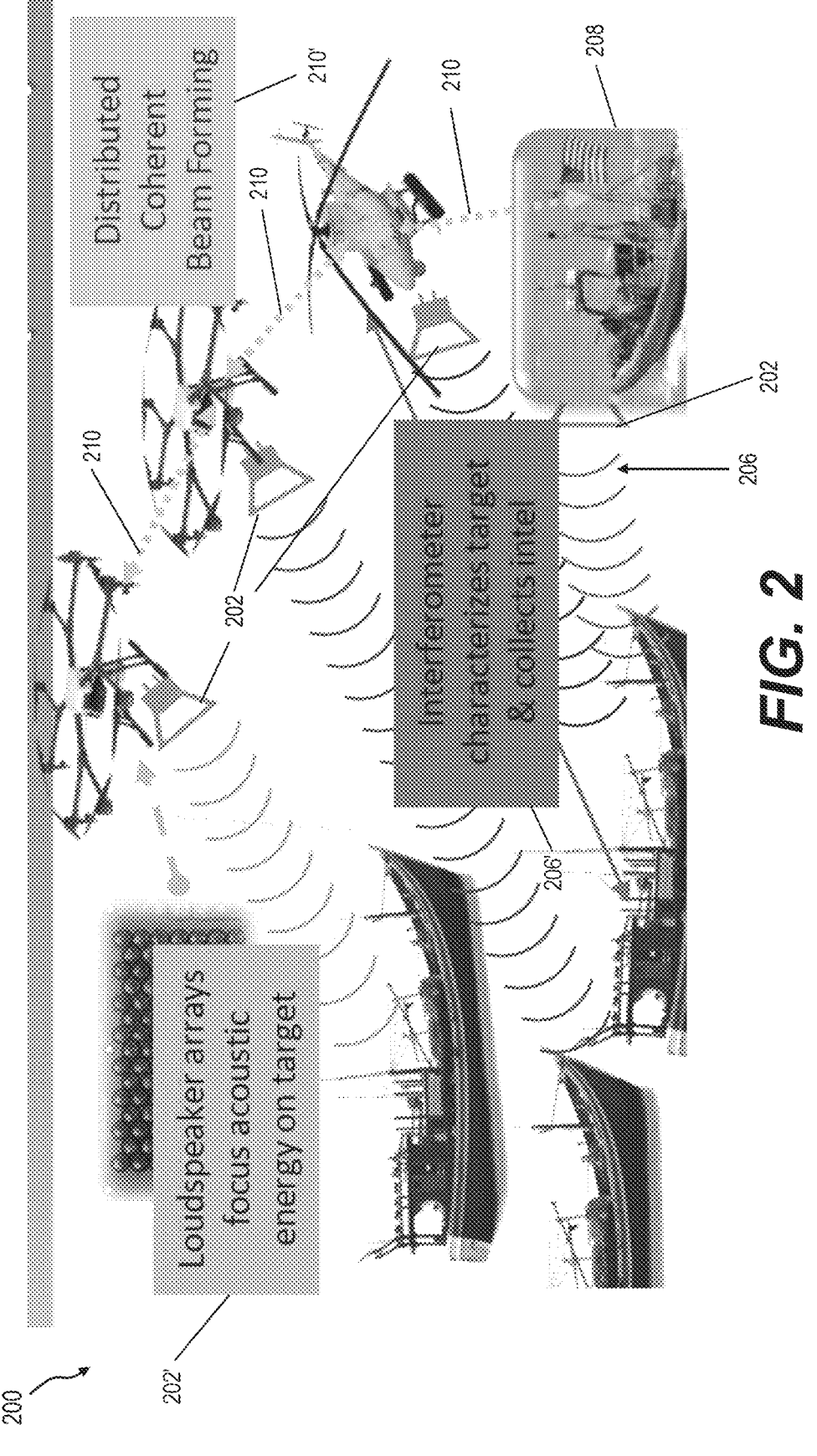
FIG. 2 illustrates an example of an acoustic system including modular and scalable ultrasonic speaker arrays according to aspects of the present disclosure.

FIG. 2 illustrates an example 200 of an acoustic system including modular and scalable ultrasonic speaker arrays (and further using at least some of the functional blocks shown in system 100) according to aspects of the present disclosure. In this example, the system 200 includes loudspeaker array devices 202, which are shown platformed or mounted on either UAV devices, or other aerial vehicles such as a helicopter drone, as examples. Each of the speakers in the array are positioned to focus acoustic energy/sound waves on one or more targets as illustrated by ships in this figure and described in functional block 202'.

In turn, reflected or detectable sound energy 206 from a target due to the transmitted sound energy is then detected using at least one interferometer system shown by block 206' (e.g., a laser interferometer system) positioned at a location (in this case on a ship 208). It is noted here that a plurality of interferometer systems could be utilized. The feedback information garnered by the interferometer system 206' is then used by a controller (not shown) that could be located at the ship 208 or accessed via wireless communication by the ship, to determine/calculate with algorithms (e.g., ML/AI algorithms) to determine adjustments to characteristics or parameters for transmitting sound energy from the array devices 202. The interferometer may also collect target information such as size, position, speed, etc. as indicated in functional block 206'. These sound characteristics or parameters are then communicated to the various platforms (UAVs, aerial devices, etc.) via network 210, which may be a wireless network as discussed in connection with FIG. 1 and as illustrated by functional block 210' indicating that distributed coherent beam forming is effected by transmitting the speaker parameters/characteristics/adjustments to sound via the network 210. This process of adjusting the sound output of one or more of the speaker devices 202 then affords coherence of the sound waves to effect beamforming of the sound energy toward the target. This adjustment or calibration may be automated, dynamic, and/or autonomous through ML algorithms, for example.

FIG. 3 illustrates an exemplary flow diagram 300 of a method that may be implemented in the systems 100 or 200 in FIGS. 1 and 2 according to some aspects. As illustrated, the method 300 includes directing acoustic energy toward one or more objects with a distributed acoustic array system as shown in block 302. Further, method 300 includes recording, detecting, and/or measuring acoustic sound energy emanating from a location of the at least one object with an interferometer as shown in block 304.

Next, method 300 includes determining one or more adjustment parameters for sound output one or more sound output devices in the distributed acoustic array based on the recorded, detected and/or measure acoustic sound energy as shown in block 306. Finally, method 300 includes communicating the determined one or more adjustment parameters to the one or more sound output devices via a network communicatively coupling the one or more sound output devices as shown in block 308.

As will appreciated by those skilled in the art, the disclosed systems and methods provide the ability to perform autonomous environmental adjustments and distributed coherence beam forming. Furthermore, advantages of the presently disclosed systems and apparatus, as compared to previously known system, include: small size; lower power requirements; self-calibrating or adjusting (e.g., autonomous calibration); interferometer and signal processing enables better performance in noisy environments; modular; the networkability of multiple systems to provide different levels of performance based on user needs; an individual system can operate independently for reduced function based on user needs; the system can be combined/integrated on numerous platforms (e.g., truck, vessel, including manned or unmanned) to enable flexible techniques (i.e., ISR, hailing, non-lethal) and combined effects (i.e., drone swarming); the system can be statically emplaced for exhibits or other entertainment venues, the system is network capable; mesh networking with fast-processing allows the system to provide distributed coherence, which allows many small systems to achieve the performance of a much larger system; mesh networking allows the system to provide unique and complicated acoustic algorithms (e.g., machine learning) to enable precise spatial audio or ultrasonic feedback; can be used for acoustic hailing and focused audio broadcasting.

In yet further aspects, the present systems and methods can be used for one or more of the following: audio recording using an interferometer (i.e., ISR); a distributed network that provides several uses such as spatial audio for static or dynamic exhibits (entertainments, sports events, music events, museum exhibits, art exhibits, theme parks, etc.), spatial haptic fields for static or dynamic exhibits (entertainments, sports events, music events, museum exhibits, art exhibits, theme parks, etc.), and/or inform drone swarming configurations/arrangements used for security forces, military, or entertainment (enhanced audio effects).

Furthermore, in an illustrative example, the disclosed system is a modular, small, lightweight, and a low-powered device that can be integrated into various manned, unmanned, etc., platforms.

In an yet further illustrative example, the disclosed system combines three technologies: (1) a small, ultrasonic parametric speaker array for broadcasting focused acoustic waveforms, (2) a laser interferometer to measure environmental noise data (e.g., ambient noise, wind spike, etc.) and record audio, and (3) a network-connected system controller to manage data from both the network and the individual components.

In another illustrative example, the disclosed system offers the option for an individual system to function alone OR to combine individual systems in a network that provides a distributed coherent beamforming function.

In yet another illustrative example, the disclosed system can conduct Intelligence, Surveillance, and Reconnaissance (ISR) missions, acoustic hailing, and scalable non-lethal effects.

In still yet another illustrative example, the disclosed system includes (1) digital signal processing; (2) embedded systems design and development; (3) Information Technology for distributed networking (i.e., Internet Of Things (IOT)); (4) machine learning/artificial intelligence (ML/AI) for device self-calibration; (5) audio systems design (speakers, pre-amps, etc.), and (6) design of emitter materials (transduction/transducer material-ceramics, etc.).

In an illustrative example, the disclosed system can be used as an entertainment performance enhancer for shows in different venues including stage or large outdoor events. For acoustic event environments with associated natural or ambient noise that distorts or degrades the performance. The device can mitigate the degradation associated with the natural or ambient noise of performances.

In an illustrative example, the disclosed system can be used for Law/Security Enforcement: Intelligence, surveillance, and reconnaissance (ISR), acoustic hailing, and scalable effects (Less-than-lethal).

In an illustrative example, the disclosed system can be used for first responders, public safety, medical, firefighters, and other emergencies.

Although the invention has been described in detail with reference to certain preferred embodiments, variations and modifications exist within the spirit and scope of the invention as described and defined in the following claims.

The invention claimed is:

1. A system for providing coherent acoustic energy, the system comprising:

a distributed speaker array system including a plurality of speakers communicatively coupled to at least one controller and where at least one of the plurality of speakers is configured to be mobile and two or more of the plurality of speakers of the distributed speaker array system are respectively located separate and apart from each other and are communicatively coupled to the at least one controller via a communication network and at least two or more of the plurality of speakers are communicatively coupled with each other via the communication network; and at least one interferometric device configured for measuring at least acoustic sound energy from the distributed speaker array system that causes vibration and/or is reflected off one or more objects;

wherein the at least one controller is configured to:
   receive the measured acoustic sound energy from the at least one interferometric device; and
   control characteristics of the acoustic sound energy being transmitted from one or more of the plurality of speakers based on the measured acoustic sound energy from the at least one interferometric device;

wherein the at least one controller is further configured to determine the control characteristics of the acoustic sound energy being transmitted by adjusting the sound energy output from one or more of the plurality of speakers to achieve sound wave coherence to form at least one air coherent sound beam generated by the distributed speaker array system and direct the at least one air coherent sound beam toward at least one object of the one or more objects.

2. The system of claim 1, wherein the at least one interferometric device comprises a laser interferometer.

3. The system of claim 1, wherein the distributed speaker array system includes one or more ultrasonic speaker devices.

4. The system of claim 1, wherein the distributed speaker array system comprises a parametric speaker array system.

5. The system of claim 1, wherein the distributed speaker array system comprises one or more of a piezoelectric speaker, a ceramic transducer speaker, and a long-range acoustic device (LRAD) speaker.

6. The system of claim 1, wherein the communication network comprises one or more of a wireless network and an electro-optical network.

7. The system of claim 1, wherein the at least one controller is further configured to utilize machine learning (ML) to determine the control of the characteristics of the acoustic sound energy being transmitted from the distributed speaker array system.

8. The system of claim 1, wherein one or more of the plurality of speakers of the distributed speaker array system is mounted to one or more of unmanned aerial vehicles (UAVs), manned aerial vehicles, ships, and land vehicles.

9. The system of claim 1, wherein the interferometer system is further configured to detect and record environmental sound conditions for determining adjustment of the distributed speaker array system.

10. A method comprising:

directing acoustic energy toward one or more objects with a distributed acoustic array system having a plurality of sound output devices that are respectively located separate and apart from each other and in communication with each other via a communication network;

recording, detecting, and/or measuring acoustic sound energy emanating from a location of at least one object of the one or more objects with an interferometer;

determining one or more adjustment parameters for sound output from the plurality of sound output devices in the distributed acoustic array based on the recorded, detected and/or measured acoustic sound energy; and communicating the determined one or more adjustment parameters to the plurality of sound output devices in the distributed acoustic array system via a network communicatively coupling the plurality of sound output devices;

wherein determining the one or more adjustment parameters includes determining the control characteristics of the acoustic sound energy being transmitted by adjusting the sound energy output from one or more of the plurality of the sound output devices to achieve sound wave coherence to form at least one air coherent sound beam generated by the distributed speaker array system and direct the at least one air coherent sound beam toward at least one object of the one or more objects.

11. The method of claim 10, wherein the interferometer comprises a laser interferometer.

12. The method of claim 10, wherein the distributed acoustic array system includes one or more ultrasonic speaker devices.

13. The method of claim 10, wherein the distributed acoustic array system comprises a parametric speaker array system.

14. The method of claim 10, wherein the distributed acoustic array system comprises one or more of a piezo-electric speaker, a ceramic transducer speaker, and a long-range acoustic device (LRAD) speaker.

15. The method of claim 10, wherein the distributed acoustic array system is communicatively coupled to at least one controller via the communication network comprising one or more of a wireless network and an electro-optical network.

16. The method of claim 15, wherein the at least one controller is configured to utilize machine learning (ML) for determining the one or more adjustment parameters.

17. The method of claim 10, wherein one or more sound output devices of the distributed acoustic array system is mounted to one or more of unmanned aerial vehicles (UAVs), manned aerial vehicles, ships, and land vehicles.

18. The method of claim 10, wherein the interferometer is further configured to detect and record environmental sound conditions for determining adjustment of the distributed acoustic array system.

* * * * *